(12) United States Patent
Fukuda

(10) Patent No.: US 8,279,747 B2
(45) Date of Patent: *Oct. 2, 2012

(54) INFORMATION PROCESSING APPARATUS AND SIGNAL TRANSMISSION METHOD

(75) Inventor: Kunio Fukuda, Tokyo (JP)

(73) Assignee: Sony Corporation, Tokyo (JP)

( * ) Notice: Subject to any disclaimer, the term of this patent is extended or adjusted under 35 U.S.C. 154(b) by 328 days.

This patent is subject to a terminal disclaimer.

(21) Appl. No.: 12/608,370

(22) Filed: Oct. 29, 2009

(65) Prior Publication Data

US 2010/0158100 A1 Jun. 24, 2010

(30) Foreign Application Priority Data

Dec. 19, 2008 (JP) ................................. 2008-324665

(51) Int. Cl.
*H04L 5/12* (2006.01)
*H04L 7/027* (2006.01)

(52) U.S. Cl. ........ 370/215; 370/535; 375/342; 375/318; 375/240.01

(58) Field of Classification Search ........................ None
See application file for complete search history.

(56) References Cited

U.S. PATENT DOCUMENTS

| | | | | |
|---|---|---|---|---|
| 3,349,182 A | * | 10/1967 | Ito et al. | 370/215 |
| 3,765,005 A | * | 10/1973 | Cannon | 360/25 |
| 4,220,816 A | * | 9/1980 | Howells et al. | 370/204 |
| 4,267,595 A | * | 5/1981 | Hernandez | 375/342 |
| 5,828,326 A | * | 10/1998 | Kikuchi | 341/99 |
| 2005/0147178 A1 | * | 7/2005 | Kikuchi | 375/288 |
| 2006/0077046 A1 | * | 4/2006 | Endo | 340/310.11 |
| 2007/0103199 A1 | * | 5/2007 | Tzartzanis et al. | 326/82 |

FOREIGN PATENT DOCUMENTS

| | | |
|---|---|---|
| EP | 0 781 054 A2 | 6/1997 |
| EP | 2 184 899 A1 | 5/2010 |
| GB | 2 242 105 A | 9/1991 |
| JP | 3-109843 | 5/1991 |

OTHER PUBLICATIONS

European Search Report dated May 21, 2012.

* cited by examiner

*Primary Examiner* — Sath V Perungavoor
*Assistant Examiner* — Mohammed Jebari
(74) *Attorney, Agent, or Firm* — Oblon, Spivak, McClelland, Maier & Neustadt, L.L.P.

(57) ABSTRACT

There is provided an information processing apparatus includes, an encoding section for encoding a bit string to generate a data signal having an amplitude of a1 and a transmission speed of b; a signal generation section for synchronously adding a clock having a frequency of b/K (K is a predetermined natural number), an amplitude of a2 (>a1), and a small duty ratio to the data signal generated by the encoding section to generate a transmission signal; and a signal transmission section for transmitting the transmission signal generated by the signal generation section.

25 Claims, 11 Drawing Sheets

INFORMATION PROCESSING APPARATUS AND SIGNAL TRANSMISSION METHOD

BACKGROUND OF THE INVENTION

1. Field of the Invention

The present invention relates to an information processing apparatus and a signal transmission method.

2. Description of the Related Art

Many information processing apparatuses such as a mobile phone, a notebook type personal computer (hereinafter, note PC), and the like include a movable member at a hinge portion which connects a main body which is operated by a user and a display section on which information is displayed. However, many signal lines and power lines are wired in the hinge portion, and a method for maintaining reliability of the wiring is desired. First, reducing the number of the signal lines passing through the hinge portion can be considered. Therefore, data transmission processing between the main body and the display section is performed by using a serial transmission method instead of a parallel transmission method. When the serial transmission method is used, effects that the number of signal lines is decreased and furthermore electromagnetic interference (EMI) is decreased can be also obtained.

In the serial transmission method, data is encoded, and then transmitted. At that time, as an encoding method, for example, a Non Return to Zero (NRZ) encoding method, a Manchester encoding method, an Alternate Mark Inversion (AMI) encoding method, and the like are used. For example, in Japanese Patent Application Laid-Open No. 03-109843, a technique in which the AMI code that is a typical example of bipolar code is used to transmit data is disclosed. Also, in the same document, a technique in which data clock is represented by an intermediate value of signal level to be transmitted, and the data clock is reproduced based on the signal level on the receiving side is disclosed.

SUMMARY OF THE INVENTION

However, in an information processing apparatus such as a note PC, even though the serial transmission method using the above code is used, the number of signal lines wired in the hinge portion is still large. For example, in a case of a note PC, there are wiring lines related to an LED backlight for illuminating an LCD in addition to video signals transmitted to the display section, thus tens of signal lines including these signal lines are wired in the hinge portion. (The above LCD is an abbreviation of Liquid Crystal Display, and the above LED is an abbreviation of Light Emitting Diode.)

Therefore, the inventor of the present invention has developed an encoding technique (hereinafter, new method) which does not include a direct-current component and can easily extract a clock component from a received signal. A signal generated by using this encoding technique can be transmitted by being superimposed on a signal containing a direct-current component. In addition, a clock can be reproduced from the signal on the receiving side. Therefore, a plurality of signal lines can be brought together, so that the number of signal lines can be reduced.

On the other hand, recently, a desired data transmission speed is drastically increased, and high-speed and stable data transmission of the serial transmission method is desired to be realized. For example, if a display with UXGA resolution is installed in a note PC, when a video signal is transmitted from the main body to the display, the transmission speed reaches about 3 Gbps (refer to FIG. 11). Since a display with VGA resolution or more may be installed also in a mobile phone (refer to FIG. 11), a technique for transmitting data stably at high speed is desired. (UXGA is an abbreviation of Ultra eXtended Graphics Array, and VGA is an abbreviation of Video Graphics Array.) From the above reasons, also in the new method in which data is transmitted with clock, high-speed and stable data transmission is desired to be realized.

In light of the foregoing, it is desirable to provide a new and improved information processing apparatus which can transmit data with clock stably at high speed, and a mode switching method.

According to an embodiment of the present invention, there is provided an information processing apparatus which includes an encoding section for encoding a bit string to generate a data signal having an amplitude of a1 and a transmission speed of b; a signal generation section for synchronously adding a clock having a frequency of b/K (K is a predetermined natural number), an amplitude of a2 (>a1), and a smaller duty ratio than that of a bit-clock of the data signal to the data signal generated by the encoding section to generate a transmission signal; and a signal transmission section for transmitting the transmission signal generated by the signal generation section.

The information processing apparatus may further include a first and a second modules connected together by a predetermined transmission line. In this case, the first module has the encoding section, the signal generation section, and the signal transmission section, the signal transmission section transmits the transmission signal through the predetermined transmission line, and the second module has a clock component extraction section for extracting a clock component of frequency b/K from the transmission signal transmitted through the predetermined transmission line, a frequency conversion section for multiplying the clock component of the frequency b/K extracted by the clock component extraction section by K to generate a clock component of frequency b, and a decoding section for decoding the bit string from a data signal detected based on the transmission signal by using the clock component of the frequency b generated by the frequency conversion section.

Furthermore, the encoding section may encode the bit string into a code form not including a direct-current component to generate the data signal.

Furthermore, the predetermined transmission line may be a power source line, and the signal transmission section may superimpose the transmission signal generated by the signal generation section on a direct-current power source to transmit the transmission signal.

Furthermore, the encoding section may encode the bit string into a bipolar code, an AMI (Alternate Mark Inversion) code or a partial response code to generate the data signal.

Furthermore, the bit string may be a video signal including an RGB signal, a horizontal synchronization signal, and a vertical synchronization signal.

Furthermore, the encoding section may add a predetermined bit value to be a clock component of frequency b/K to the top T (T≧1) bits of the bit string on a packet-by-packet basis, and the signal generation section may synchronously add the clock to the data signal so that the amplitude a2 synchronizes with the top bit to which the predetermined bit value is added by the encoding section to generate a transmission signal.

Furthermore, the predetermined bit value to be a clock component of frequency b/K may alternate plus and minus on a packet-by-packet basis.

According to another embodiment of the present invention, there is provided an signal transmission method, including the steps of encoding a bit string to generate a data signal having an amplitude of a1 and a transmission speed of b; generating a transmission signal by synchronously adding a clock having a frequency of b/K (K is a predetermined natural number), an amplitude of a2 (>a1), and a smaller duty ratio than that of a bit-clock of the data signal to the data signal generated by the encoding step; and transmitting the transmission signal generated by the transmission signal generating step.

According to another embodiment of the present invention, there is provided a program to cause a computer to realize functions held by the abovementioned apparatus. Further, a computer readable recording medium in which the program is recorded may be provided.

As described above, according to the present invention, data can be transmitted with clock stably at high speed.

DETAILED DESCRIPTION OF THE EMBODIMENTS

Figure 1:
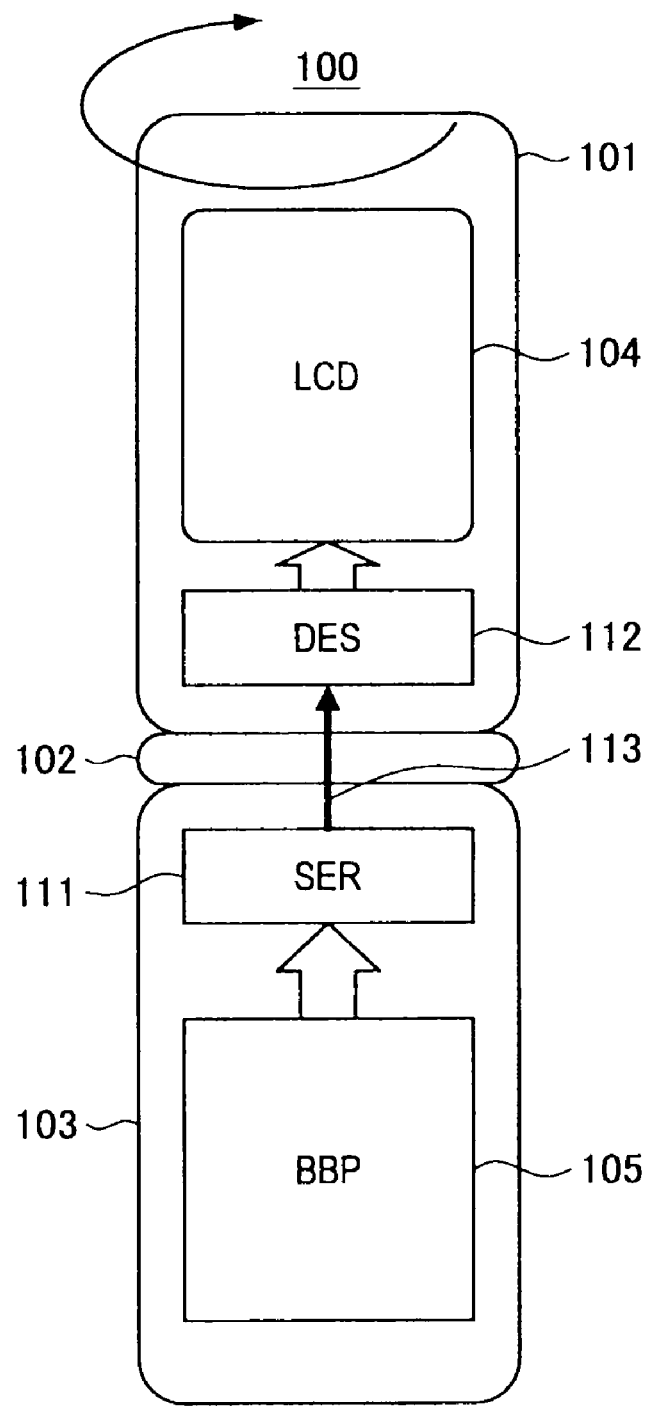
FIG. 1 is an illustration diagram showing a configuration example of a mobile phone employing a serial transmission method.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

Here, a flow of the description below related to an embodiment of the present invention will be briefly described. First, a configuration of a mobile phone 100 employing a serial transmission method will be described with reference to FIG. 1. Next, a configuration of an information processing apparatus 120 (for example, a note PC) employing the new method will be described with reference to FIG. 2. Then, a functional configuration of the information processing apparatus 120 will be described in more detail with reference to FIG. 3. In the description, an encoding method of the new method, and characteristics of a signal generated by the encoding method will be described in more detail with reference to FIGS. 4 to 6.

Further, after describing a technical problem of the new method, a functional configuration of an information processing apparatus 140 according to an embodiment of the present invention which can solve the technical problem will be described with reference to FIG. 10. In the description, an encoding method according to the embodiment, and characteristics of a signal generated by the encoding method will be described in more detail with reference to FIGS. 7 to 9. Finally, a technical idea of the embodiment will be summarized, and operational effects obtained from the technical idea will be briefly described.

(Description Items)

1: New method 1-1: Configuration of mobile phone 100 employing serial transmission method 1-2: Configuration of information processing apparatus 120 employing serial transmission method 1-3: Functional configuration of information processing apparatus 120 employing technique of new method 2: Embodiment 2-1: Functional configuration of information processing apparatus 140

2-2: Encoding method/decoding method 2-3: Summary

1: New Method

First, before detailed description of the technique according to the embodiment of the present invention, the new method which is a technical base of the embodiment will be described.

[1-1: Configuration of Mobile Phone 100 Employing Serial Transmission Method]

First, a configuration example of a mobile phone 100 employing a serial transmission method will be briefly described with reference to FIG. 1. FIG. 1 is an illustration diagram showing the configuration example of the mobile phone 100 employing a serial transmission method. However, a range of application of the technique described below is not limited to a mobile phone.

As shown in FIG. 1, the mobile phone 100 mainly includes a display section 101, a connection section 102, an operation section 103, and an liquid crystal display section 104 (LCD). In addition, the mobile phone 100 includes a baseband processor 105 (BBP), a serializer 111, a deserializer 112, and a serial signal line 113.

The mobile phone 100 transmits a video signal by the serial transmission method through the serial signal line 113 wired in the connection section 102. Therefore, in the operation section 103, the serializer 111 for serializing the video signal (parallel signal) output from the baseband processor 105 is provided. On the other hand, in the display section 101, the deserializer 112 for parallelizing the serial signal transmitted through the serial signal line 113 is provided.

The serializer 111 converts a parallel signal which is output from the baseband processor 105 and input through a parallel signal line into the serial signal. The serial signal converted by the serializer 111 is transmitted to the deserializer 112 through the serial signal line 113. The deserializer 112 restores the input serial signal to the original parallel signal, and inputs the parallel signal into the liquid crystal display section 104 through the parallel signal line. For example, a data signal encoded by the NRZ encoding method is transmitted through the serial signal line 113. However, a data signal may be transmitted with a clock signal.

The number k of wiring lines of the serial signal line 113 is significantly smaller than the number n of wiring lines of the parallel signal line (k<<n). For example, the number k of wiring lines can be reduced to only a few lines. Therefore, freedom of movable range of the connection section 102 in which the serial signal line 113 is wired is significantly greater than that of the connection section 102 in which the parallel signal line is wired. For example, when viewing a TV broadcasting program or the like using the mobile phone 100, the shape of the mobile phone 100 can be changed so that the display section 101 can be arranged to be viewed in landscape mode from a user. With the improvement of the freedom, the usage of the mobile phone 100 broadens, and various use forms such as watching movie, listening to the music, and the like, in addition to various functions as a communication terminal are generated. Furthermore, the reliability of the signal lines can be significantly improved.

Figure 2:
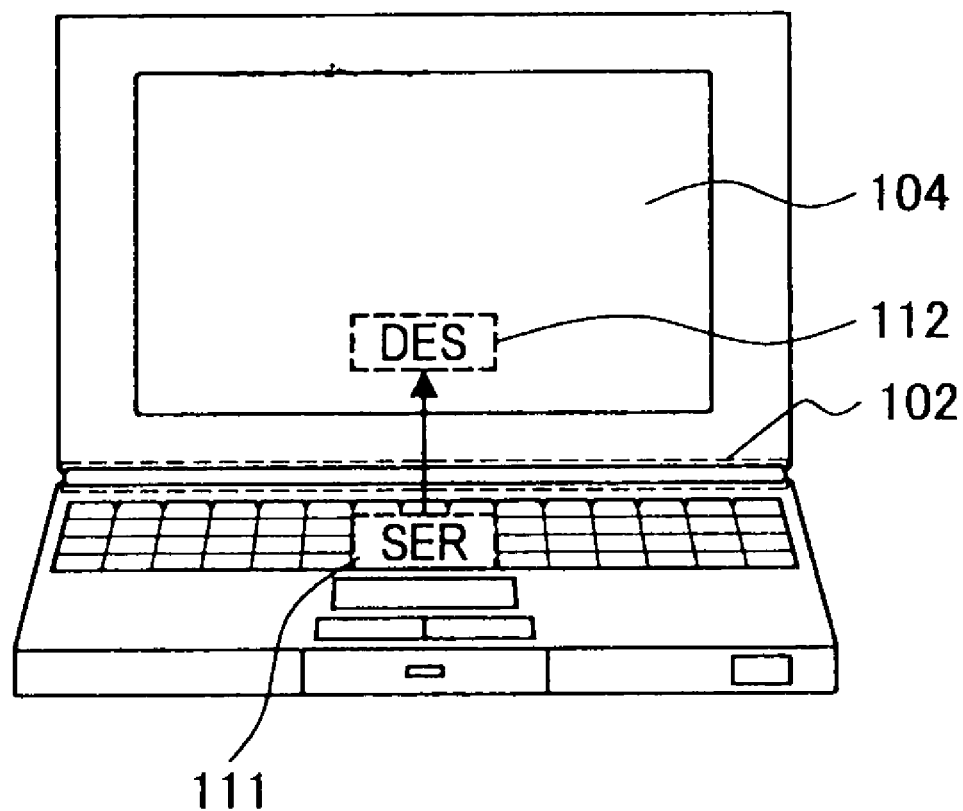
FIG. 2 is an illustration diagram showing a configuration example of an information processing apparatus employing a serial transmission method.

As described above, a great effect can be obtained by applying the serial transmission method to the mobile phone 100. This effect can also be obtained by applying the serial transmission method to other electronic devices such as a note PC. For example, when applying the serial transmission method to the information processing apparatus 120 as shown in FIG. 2, reliability of signal lines wired in the connection section 102 that is the hinge portion can be significantly improved. Especially, in the information processing apparatus 120 in which the liquid crystal display section 104 larger than that of the mobile phone 100 is installed, signal lines the number of which is greater than those of the mobile phone 100 are wired in the connection section 102. Therefore, improving the reliability of the signal lines wired in the connection section 102 is an especially important problem to be solved.

[1-2: Configuration of Information Processing Apparatus 120 Employing Serial Transmission Method]

As shown in FIG. 2, in the same way as the mobile phone 100, in the information processing apparatus 120, the serializer 111 is installed in the main body, and the deserializer 112 is installed in the display section. The serialized video signal is transmitted from the main body to the display section. However, since the resolution of the liquid crystal display section 104 is high, transmission speed of the video signal transmitted from the main body to the display section is very high. For example, when the resolution is UXGA, serial data transmitted to the display section is transmitted at a transmission speed of about 3 Gbps.

When transmitting data at such a high transmission speed, a method in which data is divided into a plurality of divided data to be transmitted is used. At this time, each of the divided data is transmitted at a transmission speed of about 1 Gbps by using a plurality of signal lines. The video signal transmitted from the main body to the display section is encoded by a predetermined encoding method, and then transmitted. Therefore, the clock of the video signal used for decoding the video signal in the display section is also transmitted from the main body to the display section. Also, electric power source is supplied from the main body to the display section. Therefore, in the connection section 102 connecting the main body and the display section, a thin wire coaxial cable with multiple cores which is used for supplying power and transmitting signals is wired.

For example, as signals transmitted through wiring in the connection section 102, there are many signals for backlight illumination besides the video signal. Therefore, there are 20 or more wiring lines including a power line, a ground line, and other control signal lines in the wiring of the connection section 102. To reduce the number of the signal lines, it can be considered a method in which an LED drive circuit (hereinafter, LED driver) used for backlight illumination is installed in the display section instead of the main body, for example. When using such an installation method, the number of signal lines used for transmitting output signals of the LED driver can be reduced.

However, in the information processing apparatus 120 such as a note PC, thinning of the display section and reducing the size of the frame area around the screen are very important to improve design. Therefore, it is desired to reduce component installation area of the display section as much as possible. Because of the above reason, the LED driver is installed in the main body. Therefore, even when the video signal is serialized, the number of wiring lines in the connection section 102 is not sufficiently reduced. As a result, the freedom of movable range of the connection section 102 is limited, and risk of disconnection fault in the wiring lines passing through the connection section 102 is still not small. Because of the above reason, a method for reducing the number of wiring lines in the connection section 102 is desired.

[1-3: Functional Configuration of Information Processing Apparatus 120 Employing Technique of New Method]

Therefore, the inventor of the present invention has developed a technique in which a video signal and a clock are superimposed on a signal containing a direct-current component such as a direct-current power source to be transmitted, and the video signal and the clock can be restored without using PLL on the receiving side. By using this technique, the video signal and the clock can be superimposed on the LED control signal or the like including a direct-current component and transmitted, and the number of the wiring lines in the connection section 102 can be significantly reduced. Hereinafter, this technique is referred to the new method.

Figure 3:
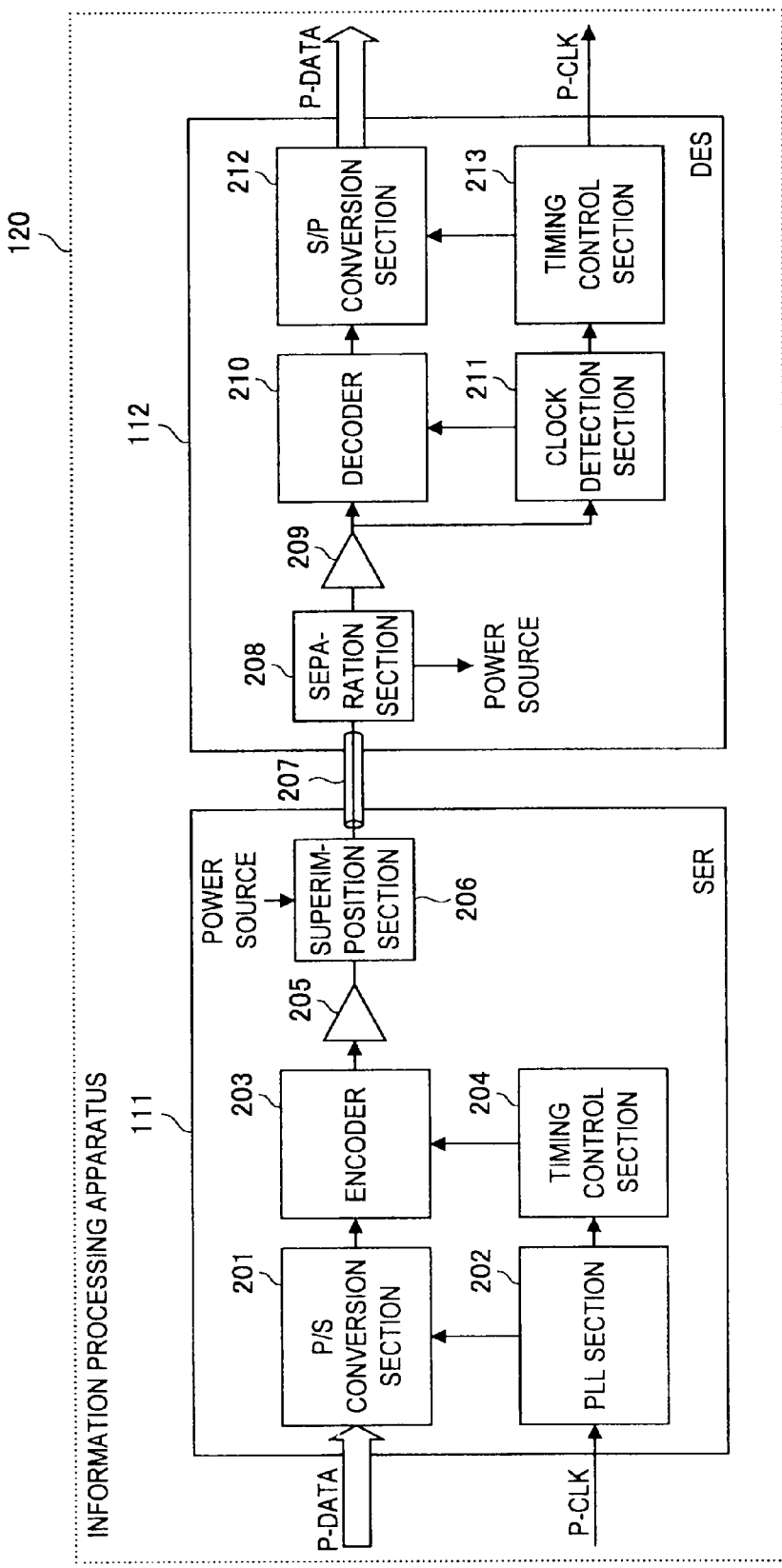
FIG. 3 is an illustration diagram showing a functional configuration example of an information processing apparatus employing a new method.

When applying the technique of the new method to the information processing apparatus 120 shown in FIG. 2, the functional configuration of the information processing apparatus 120 is as shown in FIG. 3. FIG. 3 is an illustration diagram showing a functional configuration example of the information processing apparatus 120 according to the new method. However, FIG. 3 is an illustration diagram in which functional configuration of the serializer 111 and the deserializer 112 is mainly drawn, and drawing related to other configuration elements is omitted.

(Serializer 111)

First, the serializer 111 will be described. As shown in FIG. 3, the serializer 111 includes a P/S conversion section 201, a PLL section 202, an encoder 203, a timing control section 204, a transmission buffer 205, and a superimposition section 206. The serializer 111 is connected to the deserializer 112 via a coaxial cable 207.

As shown in FIG. 3, a parallel signal (P-DATA) and a parallel signal clock (P-CLK) are input into the serializer 111. The parallel signal input into the serializer 111 is converted into a serial signal by the P/S conversion section 201. The serial signal output from the P/S conversion section 201 is input into the encoder 203. When the serial signal is input, the encoder 203 adds a header or the like to the serial signal and encodes the serial signal by a predetermined encoding method.

On the other hand, the parallel signal clock input into the serializer 111 is input into the PLL section 202. The PLL section 202 generates a serial signal clock from the parallel signal clock, and inputs the serial signal clock to the P/S conversion section 201 and the timing control section 204. The timing control section 204 controls a transmission timing of the serial signal transmitted by the encoder 203 based on the input serial signal clock.

Figure 4:
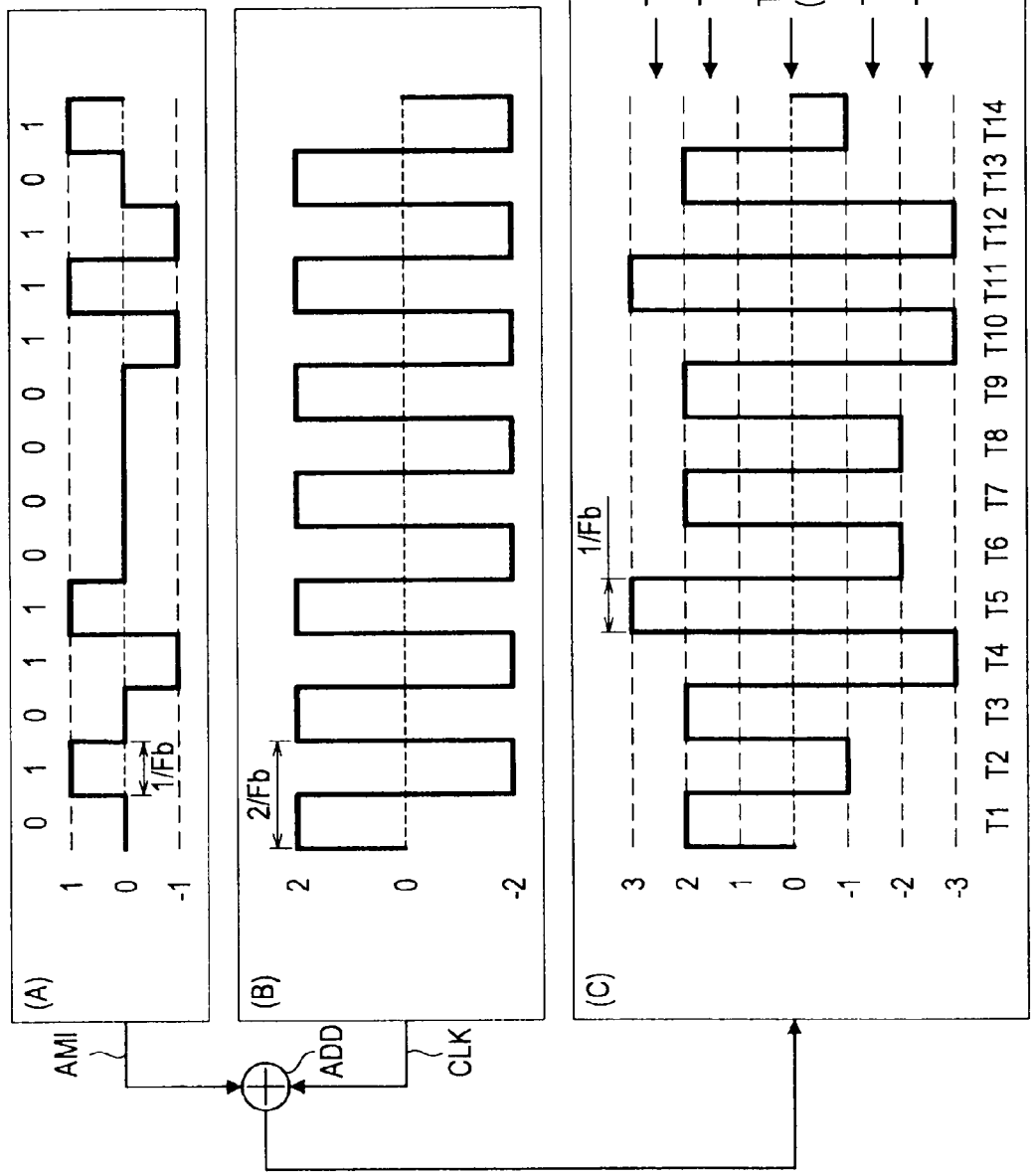
FIG. 4 is an illustration diagram showing an example of an encoding method and a decoding method of the new method.

Here, with reference to FIG. 4, a generation method of an encoded signal in the encoder 203 will be described in more detail. FIG. 4 is an illustration diagram showing an example of the encoding method according to the new method. In FIG. 4, a code generation method based on AMI code with 100% duty cycle is shown. However, a range of application of the new method is not limited to this, and the new method can be applied to codes having the same characteristics as those of the AMI code in a similar way. For example, the new method can be applied to bipolar code, partial response code, and the like.

The signal shown in (C) of FIG. 4 is the signal encoded by the encoding method of the new method. This signal represents data 1 as a plurality of potentials A1 (−1, −3, 1, 3), and represents data 0 as a plurality of potentials A2 (−2, 2) different from the potentials A1. This signal is configured to reverse polarity, and further, configured not to keep the same potential. For example, when referring a section where data "0" continues in bit intervals T6, . . . , T9, the potentials are −2, 2, −2, 2. By using such a code, even when the same data values appear continuously, by detecting both edges of a rising edge and a falling edge, the clock component can be reproduced.

The encoder 203 includes an adder ADD in order to generate a code as described above. As shown in FIG. 4, for example, the encoder 203 encodes the input serial signal into a code (A) not including a direct-current component, and inputs the code (A) into the adder ADD. In FIG. 4, as the code (A), the AMI code is exemplified which uses amplitude "1" or "−1" when data is "1", and uses amplitude "0" when data is "0". The transmission speed of code (A) is Fb, and the bit interval is 1/Fb. As the code (A) not including a direct-current component, for example, the Manchester code, the partial response code (for example, PR(1, −1), . . . , PR(1, 0, . . . , −1)), the bipolar code, and the like can be used.

The encoder 203 generates a clock (B) having a half frequency (period: 2/Fb) of the transmission speed Fb of the code (A), and inputs the clock (B) into the adder ADD. The amplitude of the clock is N times that of the code (A) (N>1; N=2 in the example of FIG. 4). The encoder 203 adds the code (A) and the clock (B) by using the adder ADD to generate a code (C). At this time, the code (A) and the clock (B) are synchronously added by adjusting the edges.

FIG. 3 is referred again. The serial signal (code (C)) encoded by the encoder 203 as described above is input into the superimposition section 206 via the transmission buffer 205. When the serial signal is input, the superimposition section 206 superimposes a direct-current power source on the serial signal to generate a superimposed signal. The superimposed signal generated by the superimposition section 206 is transmitted to the deserializer 112 via the coaxial cable 207.

(Deserializer 112)

Next, the deserializer 112 will be described. As shown in FIG. 3, the deserializer 112 includes a receiving buffer 209, an S/P conversion section 212, a timing control section 213, a clock detection section 211, and a decoder 210.

As described above, the superimposed signal is transmitted to the deserializer 112 via the coaxial cable 207. The superimposed signal is input into a separation section 208, and separated into the serial signal and the direct-current power source. The direct-current power source separated by the separation section 208 is used as a driving power source of each configuration element in the display section. The serial signal is input into the decoder 210 and the clock detection section 211 via the receiving buffer 209. The decoder 210 refers to the header of the input serial signal to detect the top portion of the data, and decodes the serial signal encoded based on a predetermined encoding method.

Here, the decoding method by the decoder 210 will be described with reference to FIG. 4 again. As described above, the serial signal is encoded into a code form shown in (C) of FIG. 4 by the encoder 203. Therefore, by determining whether the amplitude of the input signal is A1 (−1, −3, 1, 3) or A2 (−2, 2), the decoder 210 can decode the original serial signal.

To identify the amplitude A1 (−1, −3, 1, 3) corresponding to data 1 and the amplitude A2 (−2, 2) corresponding to data 0, four threshold values (L1, L2, L3, L4) shown in (C) of FIG. 4 are used. In the example of FIG. 4, the L1, L2, L3, and L4 are set as follows: $2<L1\leq3$, $1<L1\leq2$, $-2\leq L3<-1$ and $-3\leq L4<-2$. The decoder 210 compares the amplitude of the input signal and the above four threshold values, and determines whether the amplitude is A1 (−1, −3, 1, 3) or A2 (−2, 2) to decode the original serial signal.

Although four threshold values L1, L2, L3 and L4 are used to identify data 1 and data 0, if the code (C) is passed through an absolute value circuit and the minus side is inverted to the plus side, the number of the threshold values used to identify data can be reduced to two. Regarding a method for reducing the number of the threshold values used to identify data, various methods are considered other than the method using an absolute value circuit. For example, a method in which data is identified after the clock (B) is subtracted from the code (C) is an example of such method. As described above, various modifications are possible for the method for identifying data from the code (C).

FIG. 3 is referred again. The serial signal decoded by the decoder 210 is input into the S/P conversion section 212. The S/P conversion section 212 converts the input serial signal into the parallel signal (P-DATA). The parallel signal converted by the S/P conversion section 212 is output to the liquid crystal display section 104.

On the other hand, the clock detection section 211 detects a clock component from the input signal. Specifically, the clock detection section 211 compares the amplitude of the input signal and the threshold value L0 (potential 0) to detect a reversal of polarity of the amplitude, and detects a clock component based on the period of the detected reversal of polarity. The clock detected by the clock detection section 211 is input into the decoder 210 and the timing control section 213. The timing control section 213 controls a receiving timing based on the clock input from the clock detection section 211. The clock (P-CLK) input into the timing control section 213 is output to the liquid crystal display section 104.

As described above, by transmitting the signal generated by synchronously adding the clock, the clock component is easily extracted from the signal. Since the PLL is not used when extracting the clock, the scale of the circuit can be reduced by not installing the PLL in the display section, and power consumption can be reduced. Therefore, the technique of the new method is preferably used in a device for which low power consumption is important such as a mobile phone. In addition, by encoding a signal into a code form not including a direct-current component, the signal can be superimposed on a signal including a direct-current component such as a power source to be transmitted. As a result, a video signal or the like can be superimposed on a transmission line of a signal including a direct-current component and transmitted, so that the number of signal lines can be reduced.

(About Frequency Characteristics)

Figure 5:
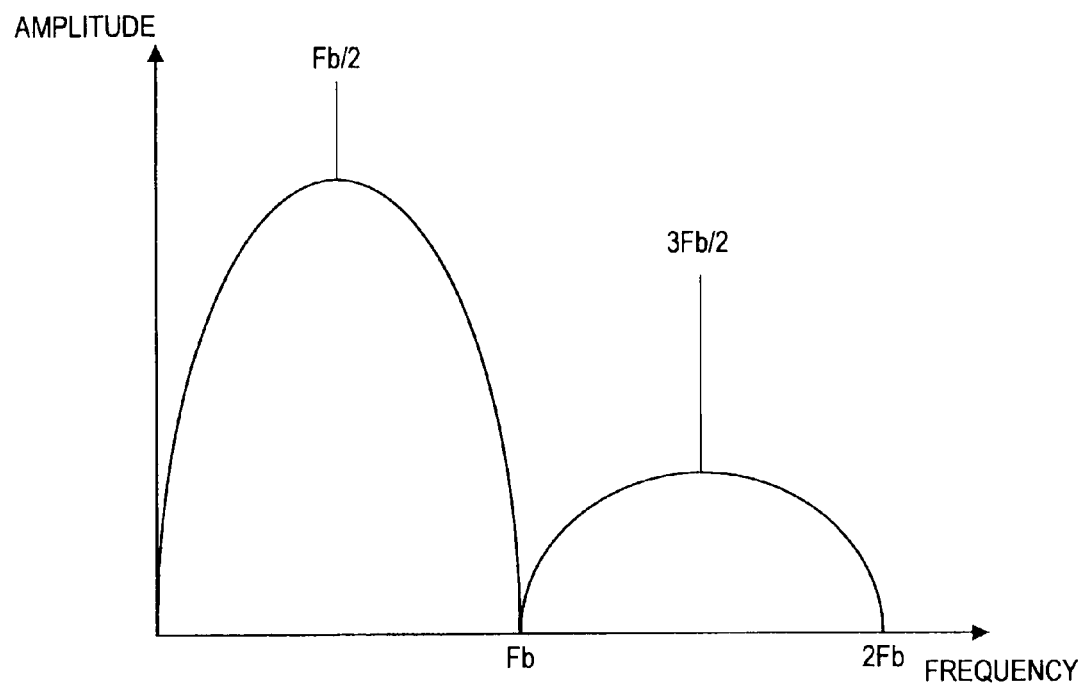
FIG. 5 is an illustration diagram showing an example of a frequency spectrum of a code according to the new method.

The frequency spectrum of the code used in the new method has a shape as shown in FIG. 5, for example. A line spectrum appears at the clock frequency Fb/2 of the clock to which a code is added by the adder ADD of the encoder 203, and at the clock frequencies of odd number times the Fb/2 (3Fb/2, . . . ) in the harmonic portion. And, in addition to the above, a broad frequency spectrum of the AMI code appears. This frequency spectrum does not include a direct-current component, and has a peak at near the frequency Fb/2. Further, this frequency spectrum becomes null at the frequencies Fb, 2Fb, 3Fb, . . . .

(About Signal Waveform: Problem for the New Method)

As described above, in the frequency spectrum of the code used in the new method, harmonic components of clock frequencies of odd number times the clock frequency Fb/2 appear as a line spectrum. Therefore, to suppress EMI, a low pass filter for cutting a high frequency component is desired. The signal received by the deserializer 112 passes through a buffer, an amplifier, and the like which do not have limitless high frequency characteristics. Therefore, actually, an eye pattern having a round top as shown in FIG. 6 is observed.

Figure 6:
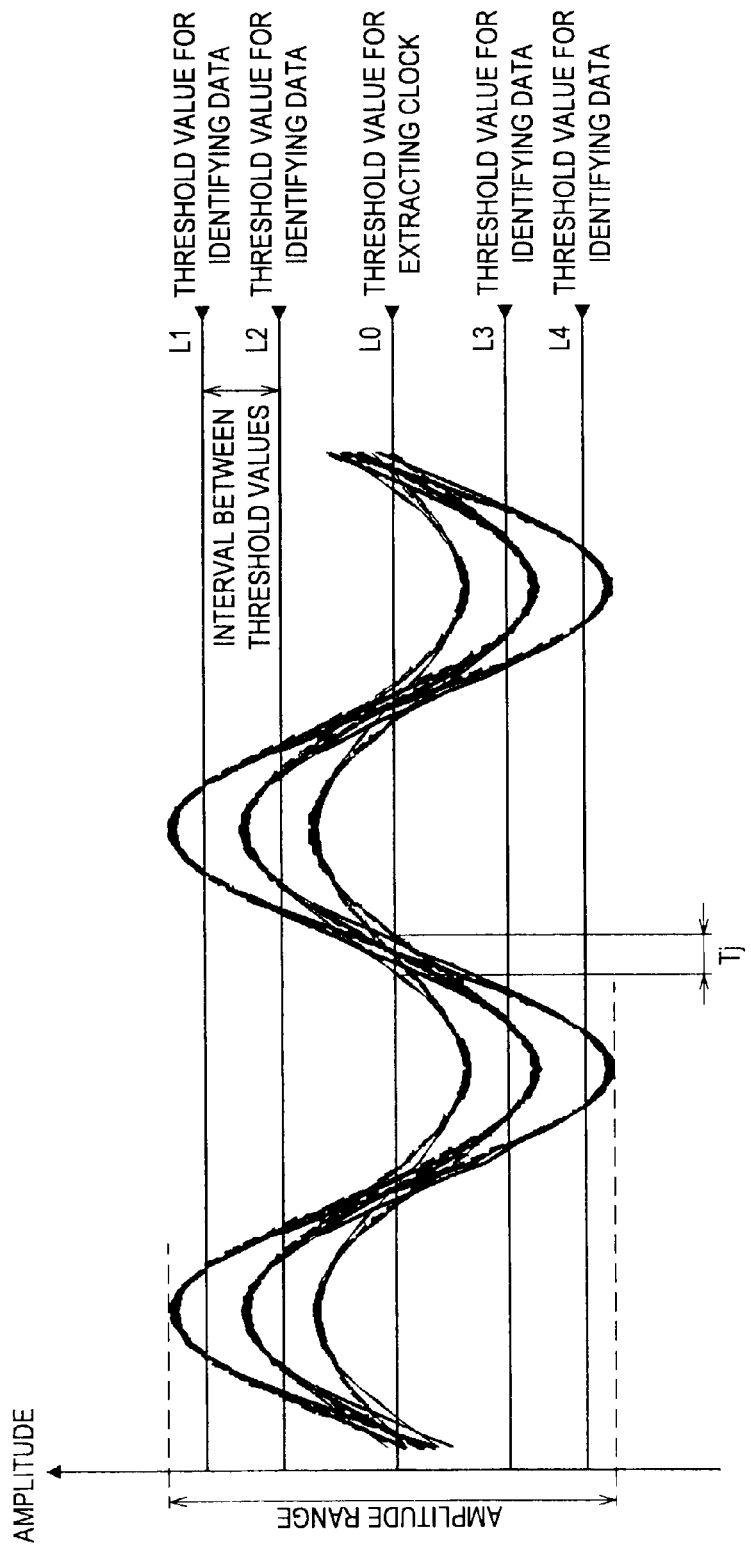
FIG. 6 is an illustration diagram showing an example of an eye pattern observed when transmitting the code of the new method.

As shown in FIG. 6, this eye pattern includes a jitter Tj. If the jitter Tj is included, when the clock detention section 211 extracts the clock, an error corresponding to the jitter Tj is generated. As a result, a transmission error tends to occur easily. As a method for reducing the effect of the jitter Tj, a method in which the clock component detected by the clock detection section 211 is passed through a band pass filter of frequency Fb/2 is considered. However, when including a band pass filter, the passband is fixed, so that the scalability of transmission speed is lost. Therefore, a method which reduces the effect of the jitter Tj without using a band pass filter and transmits a signal including a clock component stably at high speed is desired.

2: Embodiment

An embodiment of the present invention will be described. The embodiment provides a method for transmitting data and clock fast and stably by using a small number of signal lines.

[2-1: Configuration of Information Processing Apparatus 140]

First, a functional configuration of an information processing apparatus 140 according to the embodiment will be described with reference to FIG. 10. FIG. 10 is an illustration diagram showing a functional configuration example of the information processing apparatus 140 according to the embodiment. However, FIG. 3 is an illustration diagram in which functional configuration of the serializer 111 and the deserializer 112 is mainly drawn, and drawing related to the other configuration elements is omitted. Configuration elements having substantially the same function as those of the above described information processing apparatus 120 are given the same reference numerals and their detailed description is omitted.

(Serializer 111)

First, the serializer 111 will be described. As shown in FIG. 10, the serializer 111 includes a P/S conversion section 201, a PLL section 202, an encoder 301, a timing control section 204, a transmission buffer 205, and a superimposition section 206. The serializer 111 is connected to the deserializer 112 via a coaxial cable 207. A main difference between this serializer 111 and the serializer 111 included in the above described information processing apparatus 120 is the functional configuration of the encoder 301.

Figure 10:
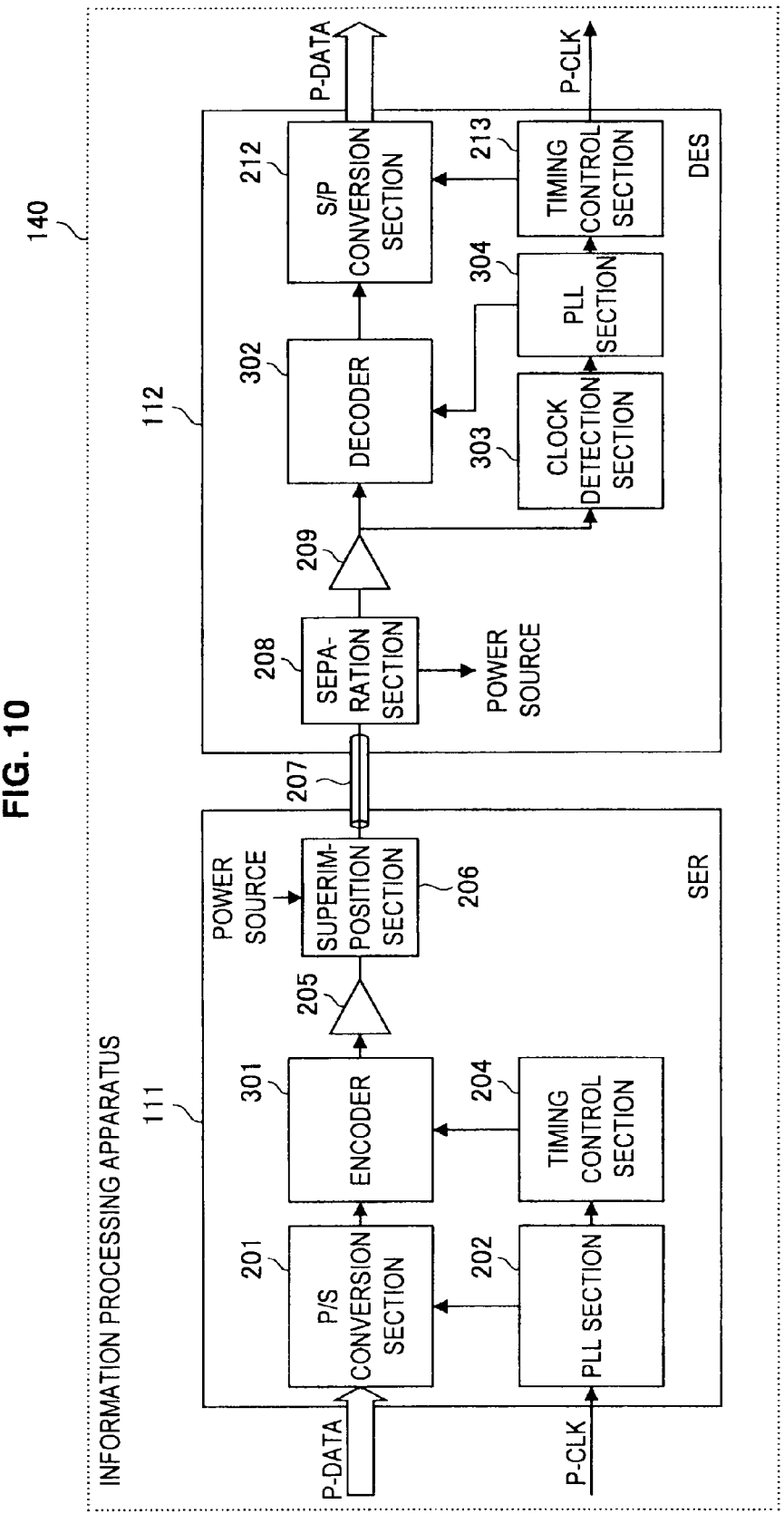
FIG. 10 is an illustration diagram showing a functional configuration example of an information processing apparatus according to the embodiment.

As shown in FIG. 10, a parallel signal (P-DATA) and a clock (P-CLK) for the parallel signal are input into the serializer 111. The parallel signal input into the serializer 111 is converted into a serial signal by the P/S conversion section 201. The serial signal output from the P/S conversion section 201 is input into the encoder 301. When the serial signal is input, the encoder 301 adds a header or the like to the serial signal and encodes the serial signal by a predetermined encoding method.

In the same way as the above described new method, the encoding method of the encoder 301 is a method which synchronously adds the clock component to the code not including a direct-current component to generate a transmission signal. However, the frequency of the clock component to be synchronously added is the frequency (Fb/K) calculated by dividing the transmission speed Fb of the above code by K (K is a natural number). This point is different from the encoding method of the above described encoder 203. The detail of the encoding method of the encoder 301 will be described below.

On the other hand, the parallel signal clock input into the serializer 111 is input into the PLL section 202. The PLL section 202 generates a serial signal clock from the parallel signal clock, and inputs the serial signal clock to the P/S conversion section 201 and the timing control section 204. The timing control section 204 controls a transmission timing of the serial signal based on the input serial signal clock. The serial signal encoded by the encoder 301 is input into the superimposition section 206 via the transmission buffer 205. When the serial signal is input, the superimposition section 206 superimposes a direct-current power source on the serial signal to generate a superimposed signal. The superimposed signal generated by the superimposition section 206 is transmitted to the deserializer 112 via the coaxial cable 207.

(Deserializer 112)

Next, the deserializer 112 will be described. As shown in FIG. 10, the deserializer 112 includes a receiving buffer 209, an S/P conversion section 212, a timing control section 213, a decoder 302, a clock detection section 303, and a PLL section 304. A main difference between this deserializer 112 and the deserializer 112 included in the above described information processing apparatus 120 is the functional configuration of the decoder 302, the clock detection section 303, and the PLL section 304.

As described above, the superimposed signal is transmitted to the deserializer 112 via the coaxial cable 207. The superimposed signal is input into a separation section 208, and separated into the serial signal and the direct-current power source. The direct-current power source separated by the separation section 208 is used as a driving power source of each configuration element in the display section. The serial signal is input into the decoder 302 and the clock detection section 303 via the receiving buffer 209. The decoder 302 refers to the header of the input serial signal to detect the top portion of the data, and decodes the serial signal encoded based on a predetermined encoding method. The detail of the decoding method of the decoder 302 will be described below.

On the other hand, the clock detection section 303 detects a clock component from the input signal. Specifically, the clock detection section 303 compares the amplitude of the input signal and the threshold value L0 (potential 0) to detect a reversal of polarity of the amplitude, and detects a clock component based on the period of the detected reversal of polarity. However, the frequency of the clock component detected here is Fb/K. However, to decode the original serial signal, reproduction of the clock having the same frequency Fb as the transmission speed Fb of the original serial signal is desired. Therefore, the clock component detected by the clock detection section 303 is input into the PLL section 304. In the PLL section 304, the input clock component is multiplied by K, so that the clock having the frequency Fb is reproduced.

The clock having the frequency Fb reproduced in the PLL section 304 is input into the decoder 302 and the timing control section 213. The timing control section 213 generates the parallel signal clock by using the clock input from the PLL section 304. The parallel signal clock (P-CLK) generated by the timing control section 213 is output to the liquid crystal display section 104. On the other hand, in the decoder 302, the original serial signal is decoded based on the clock input from the PLL section 304. The serial signal decoded by the decoder 302 is input into the S/P conversion section 212. The S/P conversion section 212 converts the input serial signal into the parallel signal (P-DATA). The parallel signal converted by the S/P conversion section 212 is output to the liquid crystal display section 104.

[2-2: Encoding Method/Decoding Method]

Figure 8:
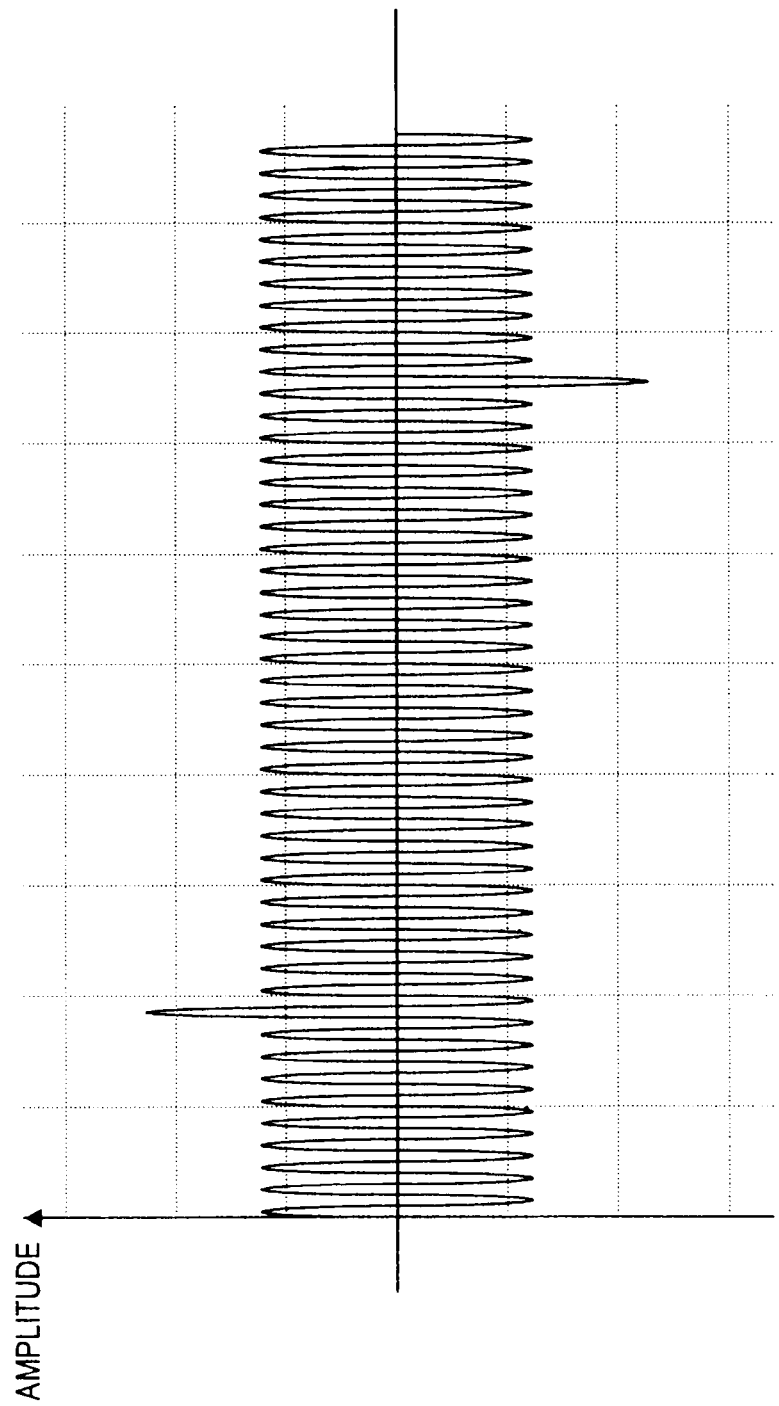
FIG. 8 is an illustration diagram showing an example of an eye pattern observed when transmitting the code of the embodiment.
Figure 9:
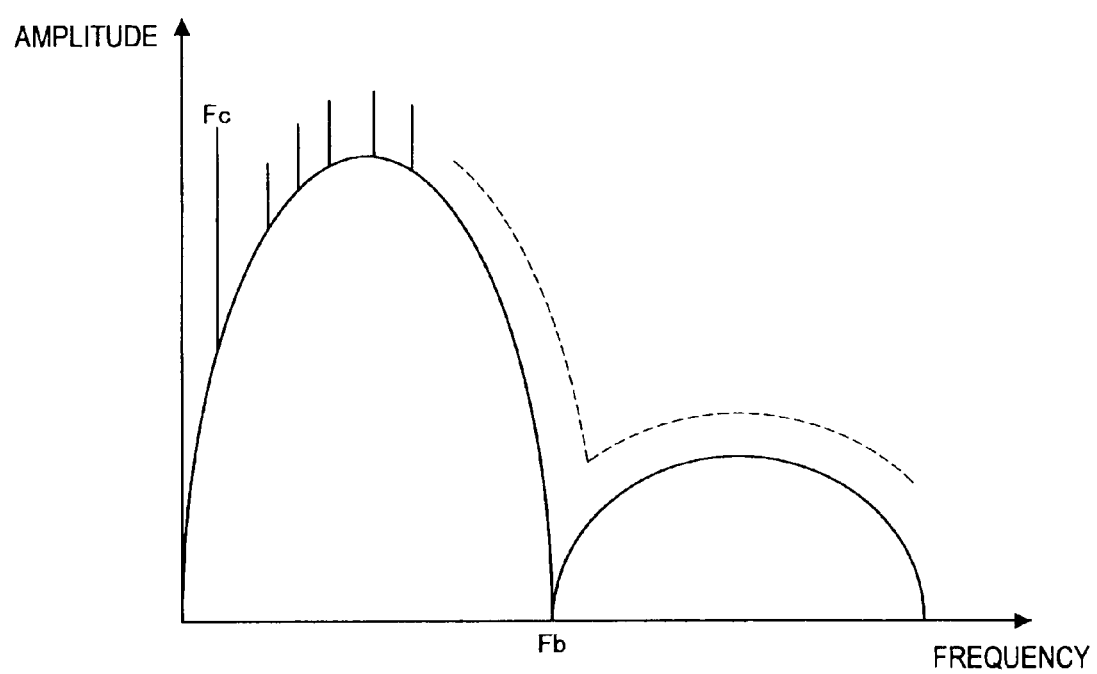
FIG. 9 is an illustration diagram showing an example of a frequency spectrum of a code according to the embodiment.

Here, with reference to FIGS. 7 to 9, the encoding method by the encoder 301 and the decoding method by the decoder 302 will be described in detail. In the description, the clock reproduction method by the clock detection section 303 and the PLL section 304 will also be described. Here, a video signal transmission method will be described as an example.

Figure 7:
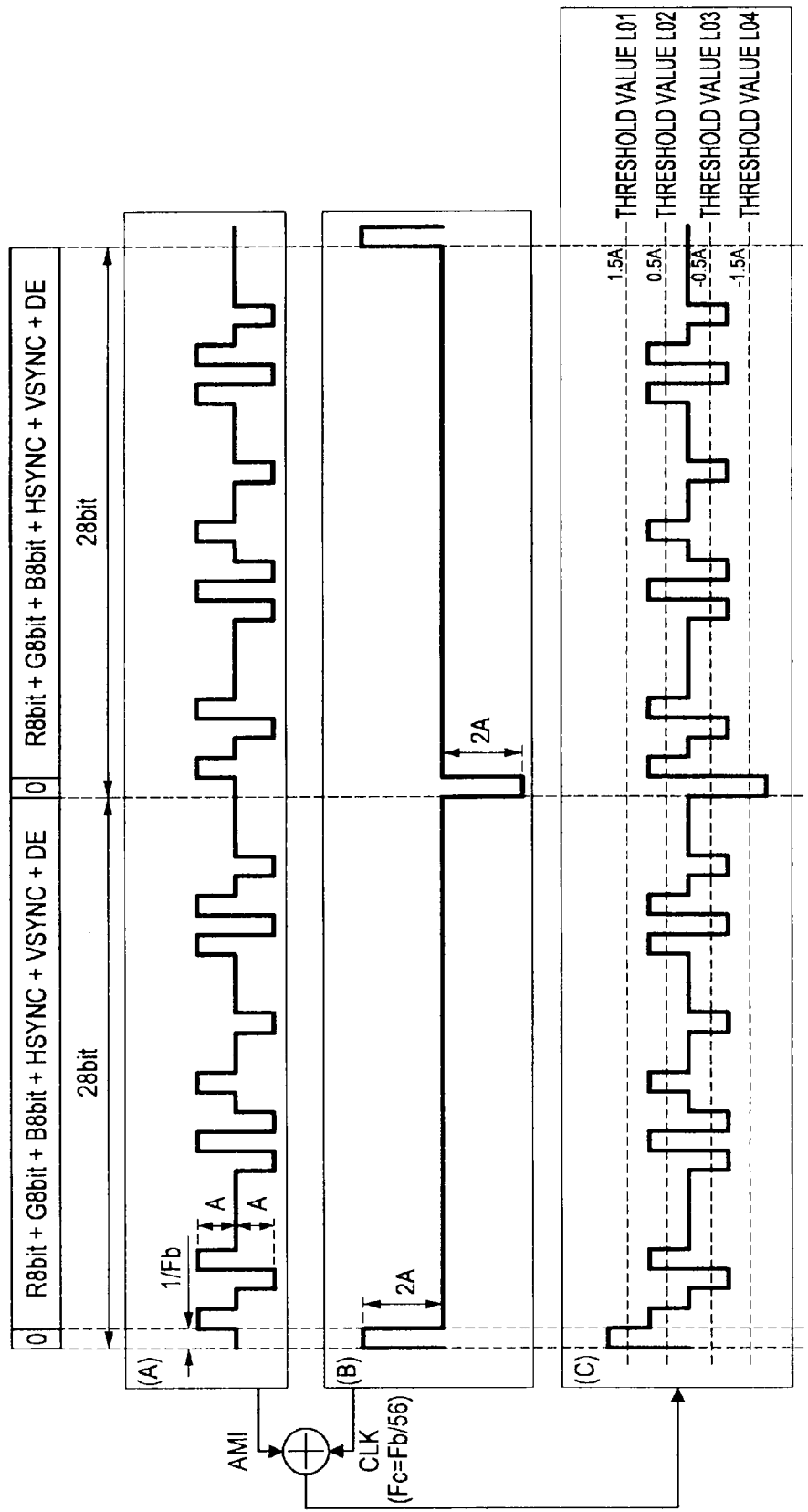
FIG. 7 is an illustration diagram showing an encoding method and a decoding method according to an embodiment of the present invention.

Referring to FIG. 7, as the video signal, generally, an RGB signal constituted by three colors of red, green, and blue is used. For example, since each color is represented by a gray scale of 8 bits, the RGB signal is a signal of 8×3=24 bits. The video signal includes a horizontal synchronization signal (HSYNC), a vertical synchronization signal (VSYNC), and a data enable signal (DE), in addition to the RGB signal. Since each of these signals is represented by one bit, the video signal includes 27 bits including 24 bits of RGB signal and the other 3 bits. In other words, generally, one packet of the video signal is constituted by a bit string of 27 bits.

However, in the embodiment, one bit data is added to such a 27-bit video signal to generate a bit string of 28 bits, and one packet constituted by a bit string of 28 bits is used. For example, the encoder 301 adds data "0" to the top of the 27-bit video signal serialized by the P/S conversion section 201 to generate a bit string of 28 bits. The encoder 301 adds data "0" to the top of each packet, and generates a bit string as shown in the top row of FIG. 7. Thereafter, the encoder 301 encodes the generated bit string of 28 bits into a code form not including a direct-current component.

In the example of FIG. 7, the bit string is encoded into an AMI code (A) having three amplitude values (−A, 0, A) and a transmission speed of Fb. In the encoder 203 according to the new method, the clock having the frequency of Fb/2 is synchronously added to the code (A) to generate the transmission signal. However, in the encoder 301 according to the embodiment, a clock (B) of a frequency of Fb/56 without a direct current component, the polarity of which reverses packet by packet is synchronously added to the code (A). However, as shown in FIG. 7, the clock (B) has an amplitude (for example, 2A) larger than that of the code (A), and has a form in which polarity of the top bit is different between two adjacent packets. In the portion other than the top bit of each packet, the amplitude of the clock (B) is "0".

When the code (A) and the clock (B) are synchronously added by the encoder 301, the code (C) is generated. As described above, the code (C) generated by the encoder 301 is superimposed on the direct-current power source and transmitted to the deserializer 112. The eye pattern of the code (C) is as shown in FIG. 8. As shown in FIG. 8, the clock component appears once every 28 bits, and the other portion is the eye pattern of the code (A). As described above, the code (C) has an amplitude of 2A or −2A of the top bit every 28 bits. Therefore, by identifying the amplitude by using the threshold value L01 (=1.5A) and the threshold value L04 (=−1.5A), the clock component of the frequency of Fb/56 included in the code (C) can be extracted. Specifically, when the amplitude is greater than the threshold value L01 or smaller than the threshold value L04, the amplitude is identified as the clock component. This identification processing is performed by the clock detection section 303.

The clock component of the frequency of Fb/56 detected by the clock detection section 303 as described above is input into the PLL section 304 and multiplied by 56. Thereafter, the clock of the frequency of Fb output from the PLL section 304 is used by the decoder 302 or the like. In the decoder 302, data is identified by using the threshold value L02 (value is 0.5A) and the threshold value L03 (value is −0.5A). When the received amplitude is smaller than the threshold value L02 or greater than the threshold value L03, the decoder 302 identifies the amplitude as data "1", and in a case other than the above, identifies the amplitude as data "0". By such an identification processing, the bit string of the video signal is decoded. As described above, the video signal decoded by the decoder 302 is parallelized by the S/P conversion section 212, and then output to the liquid crystal display section 104.

(About Frequency Characteristics)

Here, with reference to FIG. 9, frequency characteristics of the code (C) generated by the encoder 301 will be described. FIG. 9 is an illustration diagram showing an example of the frequency spectrum of the code (C) generated by the encoder 301.

As described above, the clock (B) according to the embodiment has a very low frequency of Fc=Fb/56 compared with the transmission speed Fb of the code (A). Therefore, the component of the clock (B) appearing in the frequency spectrum of the code (C) is observed as a line spectrum at the frequency Fc (<<Fb) and at frequencies of odd number times the frequency Fc. On the other hand, the component of the code (A) is observed as a broad spectrum not including a direct-current component. As described above, since the duty of the clock (B) according to the embodiment is 1/56, the average power component thereof is small. In the high frequency range, the average power component further decreases. Therefore, in the embodiment, the effect of EMI is alleviated compared with a case in which the above described new method is employed. Furthermore, the effect of jitter generated by cutting high frequencies can be suppressed.

As described above, when using the encoding method and the decoding method of the embodiment, the transmission signal can be superimposed on the direct-current power source, and data, clock, and direct-current power source can be simultaneously transmitted by using a single coaxial cable 207. In addition, by transmitting the signal while suppressing the frequency of the clock component appearing as a line spectrum in the frequency spectrum of the transmission signal, EMI can be reduced and transmission quality can be improved.

[2-3: Summary]

Finally, the functional configuration of the information processing apparatus according to the embodiment and an operational effect obtained by the functional configuration will be briefly summarized.

The functional configuration of the information processing apparatus according to the embodiment can be described as follows. The information processing apparatus is constituted by a first module and a second module as shown below. The first module corresponds to a configuration element of the main body and the second module corresponds to a configuration element of the display section.

First, the first module described above includes an encoding section, a signal generation section, and a signal transmission section. The encoding section encodes a bit string to generate a data signal having an amplitude of a1 and a transmission speed of b. The signal generation section synchronously adds a clock having a frequency of b/K (K is a predetermined natural number) and an amplitude of a2 (>a1) to the data signal generated by the encoding section to generate a transmission signal. The signal transmission section transmits the transmission signal generated by the signal generation section.

In this way, by synchronously adding a clock whose amplitude is larger than that of the data signal to the data signal to generate a transmission signal, it is possible to extract the clock component of the transmission signal by identifying the amplitude of the transmission signal. In addition, since the frequency of the clock which is synchronously added to the transmission signal is 1/K of the transmission speed b of the data signal, the duty becomes 1/K and the effect of EMI is reduced. Furthermore, the effect of jitter appearing in the waveform of the received signal due to the high frequency cut-off can be reduced, and the occurrence of transmission error due to the jitter can be suppressed. As a result, the transmission quality can be improved.

The first module and the second module are connected together by a predetermined transmission line. As described above, the first module includes the encoding section, the signal generation section, and the signal transmission section. The signal transmission section transmits the transmission signal through the predetermined transmission line. On the other hand, the second module includes a clock component extraction section, a frequency conversion section, and a decoding section as described below.

The clock component extraction section extracts a clock component of the frequency b/K from the transmission signal transmitted through the predetermined transmission line. The frequency conversion section multiplies the clock component of the frequency b/K extracted by the clock component extraction section by K to generate a clock component of the frequency b. The decoding section decodes the bit string from the data signal detected based on the transmission signal by using the clock component of the frequency b generated by the frequency conversion section.

As described above, the transmission signal includes the clock component of the frequency b/K. This clock component can be extracted by detecting the amplitude a2. However, to use the clock component for decoding the bit string, the frequency is desired to be raised to the transmission speed b of the data signal. Therefore, the information processing apparatus multiplies the clock component by K by using the frequency conversion section to generate the clock component of the frequency b. In this way, when the clock component of the frequency b is generated, the bit string is decoded from the data signal by the decoding section by using the clock component.

The encoding section may be configured to encode the bit string into a code form not including a direct-current component to generate the data signal. In this way, by encoding a signal into a code form not including a direct-current component to generate the data signal, the transmission signal can be superimposed on a signal including a direct-current component to be transmitted. For example, the predetermined transmission line may be a power source line, and the signal transmission section may be configured to superimpose the transmission signal generated by the signal generation section on the direct-current power source to transmit the transmission signal.

In this way, when the transmission signal can be transmitted through the power source line, the number of signal lines connecting the first and the second modules can be reduced. For example, when the first and the second modules are connected by a movable member, and the transmission line is wired on the movable member, the reliability of the wiring can be significantly improved. In addition, a movable range of the movable member can be increased, so that the flexibility of changing the shape of the information processing apparatus is improved. As a result, the shape can be changed depending on usage and function, so that user convenience is improved.

The encoding section may be configured to encode the bit string into the AMI code or the partial response code to generate the data signal. These codes do not include a direct-current component. Therefore, when using these codes, a transmission signal transmissible through a power source line or the like can be generated as described above. The bit string may be a video signal including the RGB signal, the horizontal synchronization signal, and the vertical synchronization signal. The bit string may be constituted by a packet string in which one packet is a bit string constituted by the RGB signal, the horizontal synchronization signal, and the vertical synchronization signal.

The encoding section may be configured to add a predetermined bit value to the top bit of the bit string on a packet-by-packet basis. The signal generation section may be configured to synchronously add the clock to the data signal so that the amplitude a2 synchronizes with the top bit to which a predetermined bit value is added by the encoding section to generate the transmission signal. In other words, the encoding section and the signal generation section may add a predetermined bit value to the top bit of the bit string on packet-by-packet basis, and form the transmission signal so that the amplitude of the clock matches the top bit.

In this embodiment, an example in which only the top bit is used as a clock is shown. However, in this case, when affected by high frequency cut-off characteristics, the pulse width of the clock decreases and the clock detection may be difficult. To remove such concern, for example, a method in which information bits are sacrificed and the number of the bits assigned to the clock is increased to more than one can be considered. In other words, in this embodiment, more than one bits are allowed to be assigned to the clock for each packet.

When employing such a configuration, even when signal processing is not performed on a data signal corresponding to the video signal, the bit string can be decoded by simply identifying the amplitude a1. For example, when the amplitude a1 is represented by (−a, +a), the bit string of the video signal can be decoded by determining whether an amplitude of the data signal except for the top bit position is smaller than a threshold value −Tha (Tha<a), or greater than a threshold value Tha.

(Note)

The encoder 301 is an example of the encoding section and the signal generation section. The encoder 301, the transmission buffer 205, the superimposition section 206 are an example of the signal transmission section. The serializer 111 is an example of the first module. The deserializer 112 is an example of the second module. The clock detection section 303 is an example of the clock component extraction section. The PLL section 304 is an example of the frequency conversion section. The decoder 302 is an example of the decoding section. The coaxial cable 207 is an example of a predetermined transmission line.

Figure 11:
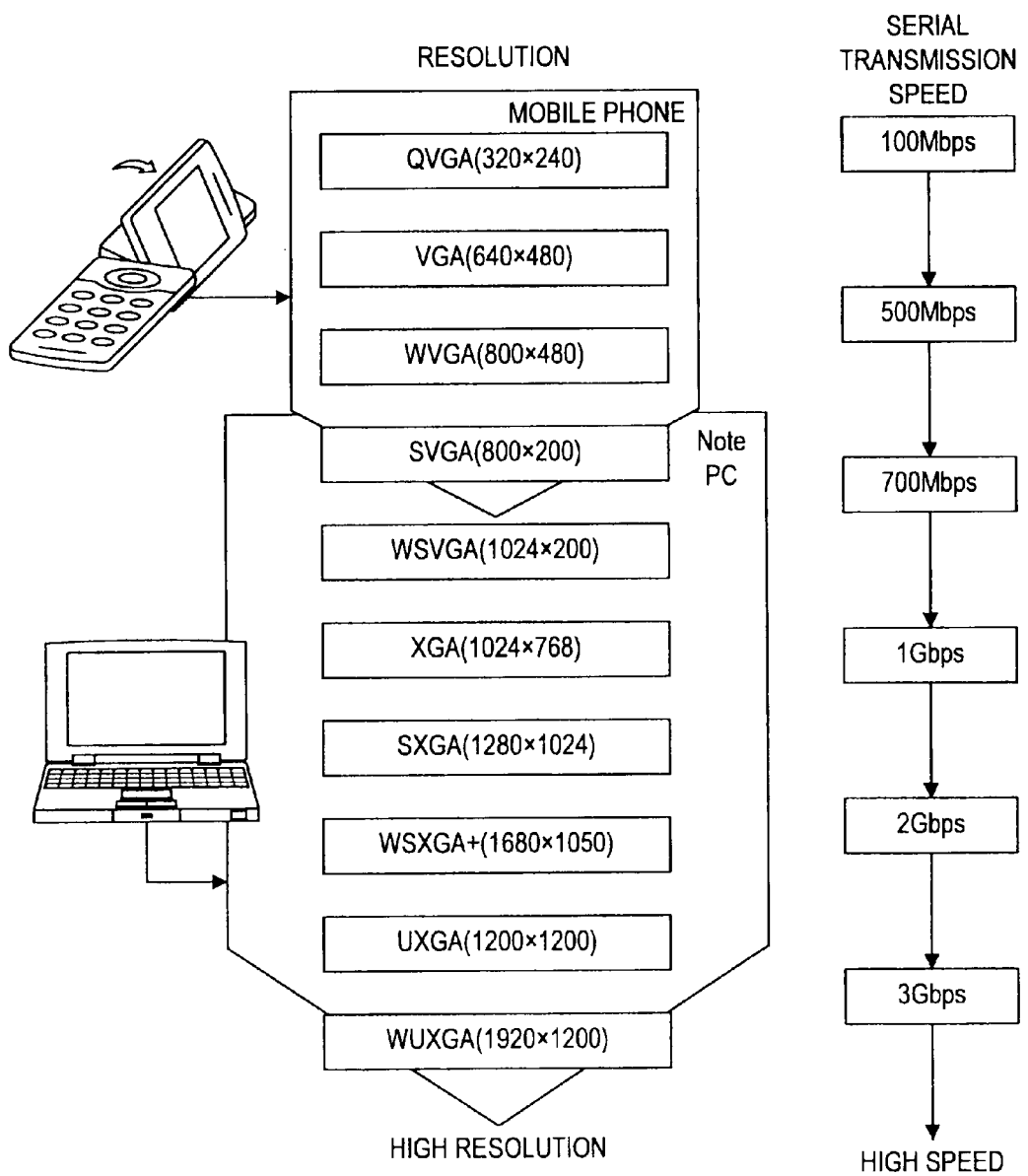
FIG. 11 is an illustration diagram schematically showing degrees of increases of serial transmission speed corresponding to increases of screen resolution.

FIG. 11 is an illustration diagram schematically showing degrees of increases of serial transmission speed corresponding to increases of screen resolution.

It should be understood by those skilled in the art that various modifications, combinations, sub-combinations and alterations may occur depending on design requirements and other factors insofar as they are within the scope of the appended claims or the equivalents thereof.

For example, in the description of the embodiment, as an example of the transmission signal, the 27-bit video signal including the RGB signal, HSYNC, VSYNC, and DE is considered. However, the application range of the technique according to the embodiment is not limited to this. First, the technique according to the embodiment can be used not only for the video signal but also for any signal transmission. Further, the length of the bit string is not limited to 27 bits (28 bits after adding the top bit). Furthermore, the data value which is added to the top of the bit string is not limited to "0".

The frequency of the clock which is synchronously added to the data signal (video signal) should be set depending on the length of the bit string constituting one packet, and not limited to 1/56 of the serial transmission speed Fb. For example, when the length of the bit string constituting one packet is k bits, the frequency of the clock which is synchronously added is set to, for example, 1/(2*k) of the serial transmission speed Fb. The amplitude of the clock which is synchronously added to the data signal only has to be larger than the amplitude of the data signal, and it is not limited to two times the amplitude of the data signal.

In addition, for convenience of description, the above embodiment is described assuming a note PC. However, the application range of the technique according to the embodiment is not limited to this, and the technique can be used in various electronic devices. For example, the technique can be applied to a mobile phone, a mobile information terminal, a music player, a digital still camera, a digital video camera, various information appliances, and the like. Especially, the technique is preferably used in an electronic device which is constituted by at least two modules connected together by a movable member and transmits data by using a transmission line wired on the movable member.

The present application contains subject matter related to that disclosed in Japanese Priority Patent Application JP 2008-324665 filed in the Japan Patent Office on 19 Dec. 2008, the entire content of which is hereby incorporated by reference.

What is claimed is:

1. An information processing apparatus, comprising:
    an encoding section for encoding a bit string to generate a data signal having an amplitude of a1 and a transmission speed of b;
    a signal generation section synchronously adding a clock having a frequency of b/K (K is a predetermined natural number), an amplitude of a2 (>a1), and a smaller duty ratio than that of a bit-clock of the data signal to the data signal generated by the encoding section to generate a transmission signal, wherein the clock is a three-level clock having successive clock pulses that alternate in polarity; and
    a signal transmission section for transmitting the transmission signal generated by the signal generation section, and
    wherein the transmission signal generated by the signal generation section is one packet of a series of packets, the clock pulses alternate in polarity on a packet-by-packet basis, and the duration of each clock pulse is less than the duration of a packet.

2. The information processing apparatus according to claim 1, further comprising:
    first and second modules connected together by a predetermined transmission line,
    wherein
    the first module has the encoding section, the signal generation section, and the signal transmission section,
    the signal transmission section transmits the transmission signal through the predetermined transmission line, and
    the second module has
    a clock component extraction section for extracting a clock component of frequency b/K from the transmission signal transmitted through the predetermined transmission line,
    a frequency conversion section for multiplying the clock component of the frequency b/K extracted by the clock component extraction section by K to generate a clock component of frequency b, and
    a decoding section for decoding the bit string from a data signal detected based on the transmission signal by using the clock component of the frequency b generated by the frequency conversion section.

3. The information processing apparatus according to claim 2, wherein the encoding section encodes the bit string into a code form not including a direct-current component to generate the data signal.

4. The information processing apparatus according to claim 3,
    wherein
    the predetermined transmission line is a power source line, and
    the signal transmission section superimposes the transmission signal generated by the signal generation section on a direct-current power source to transmit the transmission signal.

5. The information processing apparatus according to claim 3, wherein the encoding section encodes the bit string into a bipolar code, an AMI (Alternate Mark Inversion) code or a partial response code to generate the data signal.

6. The information processing apparatus according to claim 1, wherein the bit string is a video signal including an RGB signal, a horizontal synchronization signal, and a vertical synchronization signal.

7. The information processing apparatus according to claim 1,
    wherein
    the encoding section adds a predetermined bit value to be a clock component of frequency b/K to the top T (T≧1) bits of the bit string on a packet-by-packet basis, and
    the signal generation section synchronously adds the clock to the data signal so that the amplitude a2 synchronizes with the top bit to which the predetermined bit value is added by the encoding section to generate a transmission signal.

8. The information processing apparatus according to claim 7, wherein the predetermined bit value represents data 0.

9. A signal transmission method, comprising the steps of:
    encoding a bit string to generate a data signal having an amplitude of a1 and a transmission speed of b;
    generating a transmission signal by synchronously adding a clock having a frequency of b/K (K is a predetermined natural number), an amplitude of a2 (>a1), and a smaller duty ratio than that of a bit-clock of the data signal to the data signal generated by the encoding step, wherein the clock is a three-level clock having successive clock pulses that alternate in polarity; and transmitting the transmission signal generated by the transmission signal generating step; and wherein the transmission signal is one packet of a series of packets, the clock pulses alternate in polarity on a packet-by-packet basis, and the duration of each clock pulse is less than the duration of a packet.

10. The information processing apparatus according to claim 1, wherein the clock is added to the data signal so as not to interfere with the data.

11. The information processing apparatus according to claim 1, wherein K is greater than 2.

12. The information processing apparatus according to claim 1, wherein the data signal has no direct-current component.

13. An information processing apparatus, comprising:

an encoding section for encoding a bit string to generate an N-bit (N>1) serial data signal having a bit amplitude of a1 and a frequency of Fb;

a signal generation section for generating a transmission signal by synchronously adding a clock having a frequency of Fb/K (where K is a natural number) and a clock pulse amplitude of a2 (>a1) to the serial data signal generated by the encoding section, wherein the clock is a three-level clock having successive clock pulses that alternate in polarity; and a signal transmission section for serially transmitting the transmission signal generated by the signal generation section; and wherein the transmission signal generated by the signal generation section is one packet of a series of packets, the clock pulses alternate in polarity on a packet-by-packet basis, and the duration of each clock pulse is less than the duration of a packet.

14. The information processing apparatus of claim 13, wherein the serial data signal has a bit period of 1/Fb and each clock pulse has a duration of 1/Fb.

15. The information processing apparatus according to claim 13, wherein the clock is added to the serial data signal so as not to interfere with the data.

16. The information processing apparatus according to claim 15, wherein the encoding section adds one or more bits having a predetermined bit value to the bit string to become the top T (T≧1) bits of the serial data signal, and the signal generation section synchronously adds a clock pulse to the top T bits of the serial data signal to generate the transmission signal.

17. The information processing apparatus of claim 13, wherein K is greater than 2.

18. The information processing apparatus according to claim 13, wherein the serial data signal has no direct-current component.

19. The information processing apparatus according to claim 18, wherein the serial data signal generated by the encoding section is a bipolar code, an AMI (Alternate Mark Inversion) code, or a partial response code.

20. The information processing apparatus according to claim 13, wherein the bit string is a video signal including an RGB signal, a horizontal synchronization signal, and a vertical synchronization signal.

21. The information processing apparatus according to claim 13, wherein the signal transmission section superimposes the transmission signal generated by the signal generation section on a direct-current power source.

22. The information processing apparatus according to claim 13, further comprising:

first and second modules connected together by a predetermined transmission line, wherein the first module includes the encoding section, the signal generation section, and the signal transmission section, the signal transmission section transmits the transmission signal through the predetermined transmission line, and the second module includes a clock component extraction section for extracting a clock component of frequency Fb/K from the transmission signal transmitted through the predetermined transmission line, a frequency conversion section for multiplying the clock component of the frequency Fb/K extracted by the clock component extraction section by K to generate a clock component of frequency Fb, and a decoding section for decoding the bit string from a data signal detected based on the transmission signal by using the clock component of the frequency Fb generated by the frequency conversion section.

23. An information processing apparatus, comprising:

an encoding section for encoding a bit string to generate an N-bit (N>1) serial data signal having a bit amplitude of a1 and a frequency of Fb;

a signal generation section for generating a transmission signal by synchronously adding a clock having a frequency of Fb/K (where K is a natural number) and a clock pulse amplitude of a2 (>a1) to the serial data signal generated by the encoding section, wherein the clock is a three-level clock having successive clock pulses that alternate in polarity; and a signal transmission section for serially transmitting the transmission signal generated by the signal generation section; and wherein the clock is added to the serial data signal so as not to interfere with the data; and wherein the transmission signal generated by the signal generation section is one packet of a series of packets, the clock pulses alternate in polarity on a packet-by-packet basis, and the duration of each clock pulse is less than the duration of a packet.

24. The information processing apparatus according to claim 23, wherein the encoding section adds one or more bits having a predetermined bit value to the bit string to become the top T (T≧1) bits of the serial data signal, and the signal generation section synchronously adds the clock to the top T bits of the serial data signal to generate the transmission signal.

25. The information processing apparatus of claim 23, wherein K is greater than 2.

* * * * *